United States Patent
Shirakawa

(10) Patent No.: US 6,993,901 B2
(45) Date of Patent: Feb. 7, 2006

(54) EXCESS AIR FACTOR CONTROL OF DIESEL ENGINE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/312,566

(22) PCT Filed: Aug. 21, 2002

(86) PCT No.: PCT/JP02/08404

§ 371 (c)(1),
(2), (4) Date: Jan. 13, 2003

(87) PCT Pub. No.: WO03/025374

PCT Pub. Date: Mar. 27, 2003

(65) Prior Publication Data

US 2003/0110760 A1    Jun. 19, 2003

(30) Foreign Application Priority Data

Sep. 18, 2001  (JP) .............................. 2001-282638

(51) Int. Cl.
    F01N 3/00    (2006.01)
(52) U.S. Cl. .................... 60/295; 60/274; 60/276; 60/278; 60/285; 60/297
(58) Field of Classification Search ............. 60/274, 60/276, 278, 285, 286, 295, 297, 303, 311
See application file for complete search history.

(56) References Cited

U.S. PATENT DOCUMENTS

| 5,964,820 | A | | 10/1999 | Miwa et al. |
| 6,012,428 | A | | 1/2000 | Yano et al. |
| 6,119,450 | A | * | 9/2000 | Boegner et al. ............... 60/274 |
| 6,170,469 | B1 | | 1/2001 | Itoyama et al. |
| 6,173,571 | B1 | * | 1/2001 | Kaneko et al. ............... 60/286 |
| 6,247,311 | B1 | | 6/2001 | Itoyama et al. |
| 6,276,130 | B1 | * | 8/2001 | Ito et al. ........................ 60/278 |
| 6,490,857 | B2 | * | 12/2002 | Sasaki .......................... 60/278 |
| 2002/0124832 | A1 | | 9/2002 | Oota et al. |

FOREIGN PATENT DOCUMENTS

| EP | 0 764 771 A2 | 3/1997 |
| EP | 1 031 719 A2 | 8/2000 |
| JP | 6-159037 A | 6/1994 |
| JP | 6-272541 A | 9/1994 |
| JP | 6-346763 A | 12/1994 |

* cited by examiner

Primary Examiner—Tu M. Nguyen
(74) Attorney, Agent, or Firm—Foley & Lardner LLP

(57) ABSTRACT

A diesel engine (1) provided with a NOx catalyst (28A) and a diesel particulate filter (28B) performs lean burn operation during normal running, rich burn operation during regeneration of the NOx catalyst (28A), operation under the stoichiometric air-fuel ratio during desulphating of the NOx catalyst (28A), and operation under a slightly lean air-fuel ratio to regenerate the filter after desulphating of the NOx catalyst (28A). When the lean burn operation is applied, a controller (31) first controls the fuel injection amount, and controls an air supply amount based on the fuel injection amount. When rich burn operation is applied, the controller (31) first controls the air supply amount and controls the fuel injection amount based on the air supply amount. Due to this control, the response of the excess air factor control is enhanced while preventing torque fluctuation accompanying the variation of the target excess air factor.

29 Claims, 13 Drawing Sheets

EXCESS AIR FACTOR CONTROL OF DIESEL ENGINE

FIELD OF THE INVENTION

This invention relates to control of the excess air factor of a diesel engine.

BACKGROUND OF THE INVENTION

Exhaust gas purification techniques in diesel engines for vehicles are divided roughly into two categories, one for improving combustion of the air-fuel mixture so as to reduce generation of noxious substances, and the other one for purifying the noxious substance contained in the exhaust gas.

As to the former techniques, Tokkai Hei 6-346763 published by the Japanese Patent Office in 1994 discloses performing exhaust gas recirculation (EGR) and making the ignition lag, i.e., the lag between the start of fuel injection and the start of combustion, considerably longer.

EGR brings about a decline of combustion temperature and reduces the generation of nitrogen oxides (NOx) as a result.

If the ignition lag is made considerably longer, the engine heat generation pattern becomes single stage and mixing of air and fuel is promoted, so the combustion type will be pre-mixing combustion. The pre-mixing combustion has the effect of suppressing the generation of particulate matter (PM).

As for the latter techniques, Tokkai Hei 6-272541 and Tokkai Hei 6-159037 published by the Japanese Patent Office in 1994 disclose a NOx trap catalyst and a diesel particulate filter (DPF).

The NOx trap catalyst traps the NOx in the exhaust gas when the diesel engine performs combustion at a lean air-fuel ratio, and reduces trapped NOx by reducing agents such as hydrocarbons (HC) and carbon monoxide (CO) in the exhaust gas when the engine performs combustion at a stoichiometric air-fuel ratio or a rich air-fuel ratio.

By periodically performing the combustion at the stoichiometric or rich air-fuel ratio, therefore, the NOx is purified and the NOx trap function of the catalyst is regenerated.

The diesel particulate filter traps the PM contained in the exhaust gas of the diesel engine, and when the trapped PM reaches a fixed quantity, the engine burns the trapped PM at the stoichiometric or slightly lean air-fuel ratio so as to purify the PM and regenerate the filter.

SUMMARY OF THE INVENTION

The diesel engine provided with such an exhaust gas purifying device is usually operated under a lean air-fuel ratio at which the excess air factor is 1.4 or more.

When there is a need to regenerate the NOx trap catalyst or diesel particulate filter, the engine is operated at a rich air-fuel ratio where the excess air factor is less than unity or at the stoichiometric air-fuel ratio at which the excess air factor is equal to unity.

As a control for realizing a target excess air factor, U.S. Pat. No. 6,247,311 discloses an excess air factor control system in which a target fuel injection amount is first determined according to the depression amount of the accelerator pedal of the vehicle, and the engine rotation speed.

The target intake air amount is then calculated from the target fuel injection amount and the target excess air factor.

The system controls the opening of the intake throttle, turbocharging pressure of the turbocharger, and the opening of the exhaust gas recirculation valve so that the target intake air amount is realized.

As fuel is an incompressible fluid, and the fuel injector is installed in the engine combustion chamber or its vicinity in the diesel engine, the control of fuel injection amount is not accompanied by a time delay.

On the other hand, the turbocharger and an intake throttle both of which adjust the intake air amount are installed at a position distant from the combustion chamber of the engine, and as air is a compressible fluid, control of the intake air amount is accompanied by a large time delay.

Therefore, when shifting the target excess air factor from 1.4 or more to 1.0 or a lower value for regeneration of the NOx trap catalyst or diesel particulate filter, the most responsive way of control to achieve the new target excess air factor is to increase the fuel injection amount.

However, if the fuel injection amount is increased when the target excess air factor is larger than unity, i.e., at a lean air-fuel ratio, the engine output torque will increase.

It is not desirable that the engine output torque increases every time the NOx trap catalyst or diesel particulate matter filter is regenerated.

There is also a different approach to attain the new target excess air factor in a short time but without increasing the engine output torque. This is the delay compensation control of the intake air amount. In this control, the delay in the intake air amount control is previously assessed and compensated by a delay compensation process based on the assessed delay.

However, the delay of intake air amount varies largely according to the engine running conditions, and it is difficult to compensate the delay with sufficient accuracy under various engine operating conditions.

It is therefore an object of this invention to increase the accuracy and response of the excess air factor control while preventing the change in the engine output torque.

In order to achieve the above object, this invention provides an excess air factor control device for such a diesel engine that burns a mixture of air supplied by an air supply mechanism and fuel supplied by a fuel supply mechanism.

The device comprises a sensor which detects a running state of the diesel engine; and a programmable controller. The programmable controller is programmed to set a target excess air factor of the mixture based on the running state, control an air supply amount of the air supply mechanism to a target air supply amount calculated from a predetermined fuel supply amount and the target excess air factor when the target excess air factor is larger than a value equivalent to a stoichiometric air-fuel ratio, and control a fuel supply amount of the fuel supply mechanism to a target fuel supply amount calculated from a predetermined air supply amount and the target excess air factor when the target excess air factor is smaller than the value equivalent to the stoichiometric air-fuel ratio.

This invention also provides an excess air factor control method for the diesel engine, comprising detecting a running state of the diesel engine, setting a target excess air factor of the mixture based on the running state, controlling an air supply amount of the air supply mechanism to a target air supply amount calculated from a predetermined fuel supply amount and the target excess air factor when the target excess air factor is larger than a value equivalent to a stoichiometric air-fuel ratio, and controlling a fuel supply amount of the fuel supply mechanism to a target fuel supply amount calculated from a predetermined air supply amount and the target excess air factor when the target excess air factor is smaller than the value equivalent to the stoichiometric air-fuel ratio.

The details as well as other features and advantages of this invention are set forth in the remainder of the specification and are shown in the accompanying drawings.

DESCRIPTION OF THE PREFERRED EMBODIMENTS

Figure 1:
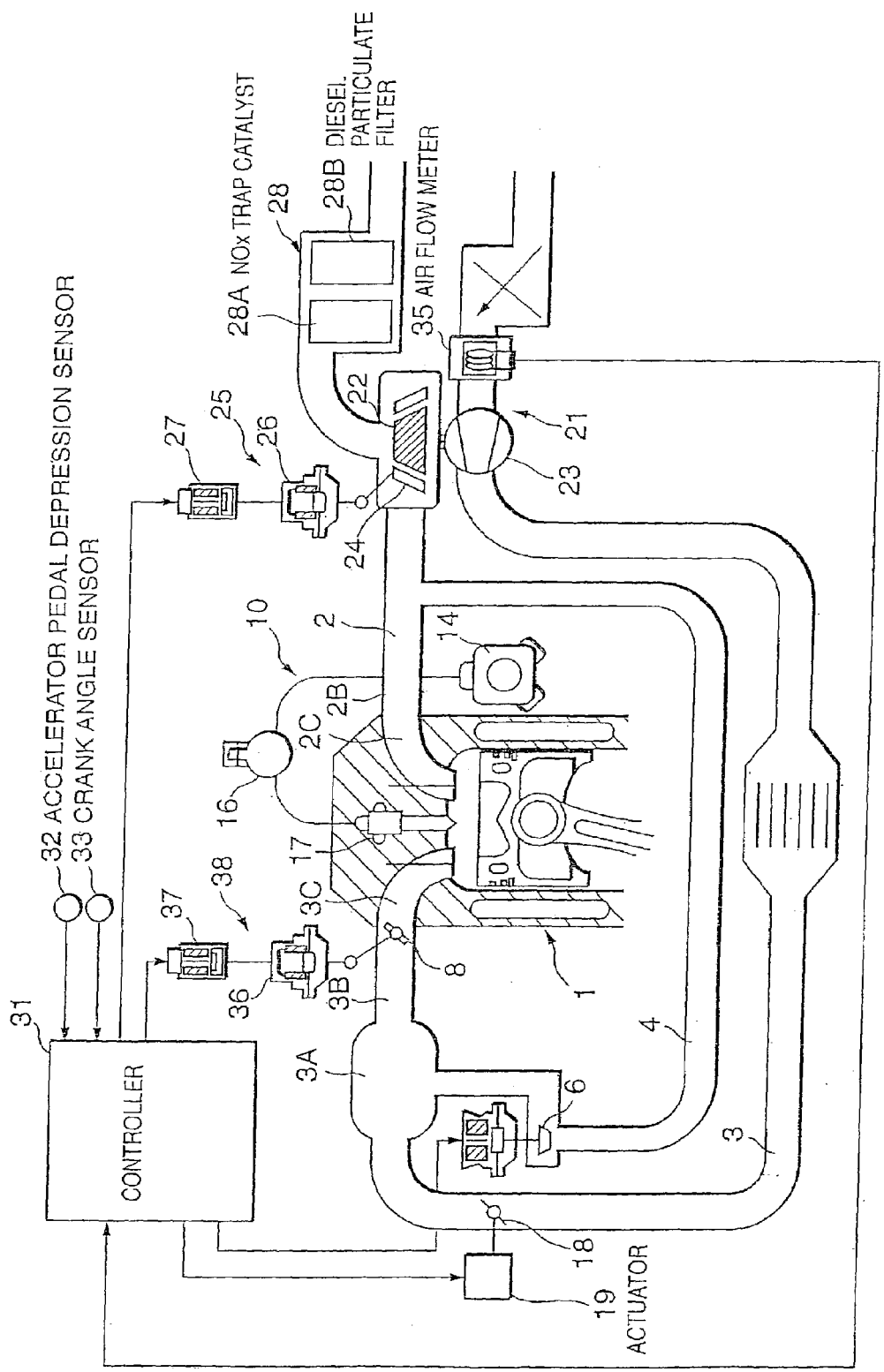
FIG. 1 is a schematic diagram of an excess air factor control device of a diesel engine according to this invention.

Referring to FIG. 1 of the drawings, a multi-cylinder diesel engine 1 is provided with an exhaust passage 2 and an intake passage 3.

The intake passage 3 is connected to an intake port 3C provided for each cylinder via an intake manifold 3B which branches off from a collector 3A.

The exhaust gas passage 2 is connected to an exhaust port 2C provided for each cylinder via an exhaust manifold 2B.

Air from a compressor 23 of a variable capacity turbocharger 21 is supplied to the intake passage 3.

The variable capacity turbocharger 21 drives the compressor 23 by rotation of an exhaust gas turbine 22 installed in the exhaust passage 2.

The exhaust gas turbine 22 is provided with a variable nozzle 24 driven by an actuator 25 at the inlet of a scroll.

In the low rotation speed region of the diesel engine 1, the variable nozzle 24 increases the flow velocity of the exhaust gas which flows into the exhaust gas turbine 22 by narrowing the opening, and in the high rotation speed region, it is opened fully to reduce the inflow resistance of exhaust gas to the exhaust gas turbine 22.

The actuator 25 comprises a diaphragm actuator 26 which drives the variable nozzle 24 according to a supply pressure, and a pressure control valve 27 which supplies pressure to the diaphragm actuator 26.

The pressure control valve 27 supplies the pressure according to a pressure signal which a programmable controller 31 outputs to the diaphragm actuator 26.

An intake throttle 18 which adjusts the intake air amount of the diesel engine 1 is installed upstream of the collector 3A of the intake passage 3.

The intake throttle 18 is operated via an actuator 19 which responds to a drive signal from the controller 31

A swirl control valve 8 operated by an actuator 38 is installed in the intake port 3C. The velocity of intake air is increased by closing the swirl control valve 8 when the intake air amount of the diesel engine 1 is small. A swirl is formed inside each cylinder, and mixing of air and fuel is thereby promoted.

The actuator 38 comprises a diaphragm actuator 36 which drives the swirl control valve 8 according to a supplied pressure and a pressure control valve 37 which supplies pressure to the diaphragm actuator 36 in response to a pressure signal supplied from the controller 31.

A fuel injector 17 provided in each cylinder injects fuel into the air aspirated by each cylinder from the intake passage 3 and a mixture of air and fuel is generated in each cylinder.

The diesel engine 1 burns this air-fuel mixture by compression ignition to generate motive force.

Fuel from a fuel supply device 10 is supplied to the fuel injector 17. The fuel supply device 10 is provided with a supply pump 14 and a common-rail 16.

The supply pump 14 pressurizes the fuel in a fuel tank, not shown, and supplies it to the common-rail 16.

The common-rail 16 is provided with a pressurizing chamber, and supplies fuel to each fuel injector 17 under a fixed fuel pressure. The fuel injector 17 opens according to a fuel injection signal from the controller 31, and injects fuel into each cylinder.

A fuel injection signal comprises pulse signals, and the pulse width corresponds to the fuel injection amount. The timing of the appearance of a pulse signal corresponds to the fuel injection timing.

The fuel injector 17 therefore constitutes a fuel supply mechanism of the diesel engine 1.

The combustion gas of the air-fuel mixture is discharged into the atmosphere through the exhaust passage 2 from the exhaust port 2C and exhaust manifold 2B.

A part of the exhaust gas in the exhaust passage 2 is recirculated into the collector 3A via an exhaust gas recirculation (EGR) passage 4. An exhaust gas recirculation (EGR) valve 6 for adjusting the exhaust gas flowrate of the EGR passage 4 is provided in the EGR passage 4. The EGR valve 6 is a diaphragm-type valve which responds to a drive signal from the controller 31.

An exhaust gas purification device 28 is installed downstream of the exhaust gas turbine 22 of the exhaust passage 3. The exhaust purification device 28 comprises a NOx trap catalyst 28A and a diesel particulate matter filter (DPF) 28B accommodated in a single casing.

The NOx trap catalyst 28A traps the NOx contained in the exhaust gas under a lean air-fuel ratio, and reduces NOx to harmless nitrogen and harmless oxygen by HC and CO in the exhaust gas generated under a rich air-fuel ratio or a stoichiometric air-fuel ratio. Due to the reduction of the trapped NOx, the NOx trap function of NOx trap catalyst 28A is regenerated.

The DPF28B traps the particulate matter (PM) in the exhaust gas. The trapped PM is burned by the operation of the diesel engine 1 at a slightly lean air-fuel ration with respect to the stoichiometric air-fuel ratio. The PM trap function of the DPF28B is regenerated by burning the trapped PM.

The diesel engine 1 lowers the oxygen concentration of the intake air by performing EGR, and reduces the NOx generation amount by reducing the combustion temperature of the air-fuel mixture.

Also, the PM generation amount is reduced by considerably lengthening the ignition lag and realizing pre-mixing combustion by a single stage heat generation pattern.

In order to realize the pre-mixing combustion, it is necessary to maintain the combustion temperature and ignition lag within a predetermined range.

In the high load region of the diesel engine 1 with a high EGR gas temperature, or the high rotation speed region with a short combustion period, pre-mixing combustion is impossible.

Therefore, in the region in which pre-mixing combustion is impossible, so-called diffusive combustion is performed where combustion is performed while mixing fuel and air.

Figure 2:
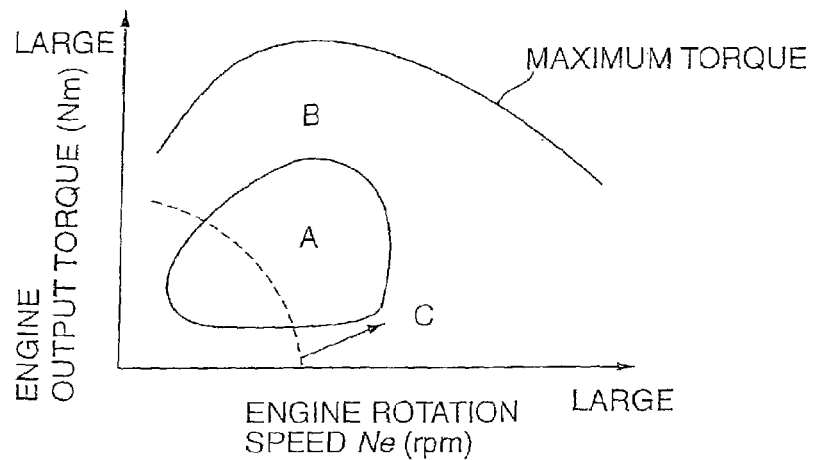
FIG. 2 is a diagram describing an operating range of the diesel engine.

Referring to FIG. 2, pre-mixing combustion is performed in a pre-mixing combustion region A specified by an engine rotation speed Ne and engine output torque, and diffusive combustion is performed in other regions B and C.

Further, in the Region A and Region B, a lean air-fuel ratio is applied, and a rich air-fuel ratio is applied in Region C.

In operation under a lean air-fuel ratio, NOx is trapped by the NOx trap catalyst 28A. If this trapped amount reaches a fixed quantity, operation of the diesel engine 1 will be performed under a rich air-fuel ratio in order to reduce the trapped NOx and regenerate the trap capability of the NOx trap catalyst 28A.

The NOx trap catalyst 28A is poisoned by the very small quantity of SOx contained in the exhaust gas. Therefore, when the SOx deposition amount of the NOx trap catalyst 28A reaches a tolerance limit, operation of a diesel engine 1 is performed near the stoichiometric air-fuel ratio in order to raise the exhaust gas temperature to cause the deposited SOx to be released from the NOx trap catalyst 28A. This process is referred to as desulphating.

When the PM trapped by the diesel particulate filter 28B reaches the maximum permissible quantity, the exhaust gas temperature is raised to around 300 degrees C., the PM is burned, and the diesel particulate filter 28B is regenerated. A slightly lean air-fuel ratio with respect to the stoichiometric air-fuel ratio is applied in this operation.

The control of these air-fuel ratios is performed by the controller 31 by operating the fuel injector 17, the variable nozzle 24 and the EGR valve 6.

If only the turbocharger 21 is operated in the low load region near idle rotation, combustion at the desired rich air-fuel ratio or stoichiometric air-fuel ratio is not realized easily. Hence, in the low load region near idle rotation, a rich air-fuel ratio or the stoichiometric air-fuel ratio is achieved by throttling the intake throttle 18 to suppress the intake air amount. Instead of the intake throttle 18, an exhaust throttle may be provided.

The EGR valve 6 varies the exhaust gas recirculation amount, and varies the proportion of the fresh air amount aspirated by the diesel engine 1 in the total intake gas amount thereof.

The above variable nozzle 24, intake throttle 18, and EGR valve 6 constitute an air supply mechanism in this diesel engine 1.

Figure 3:
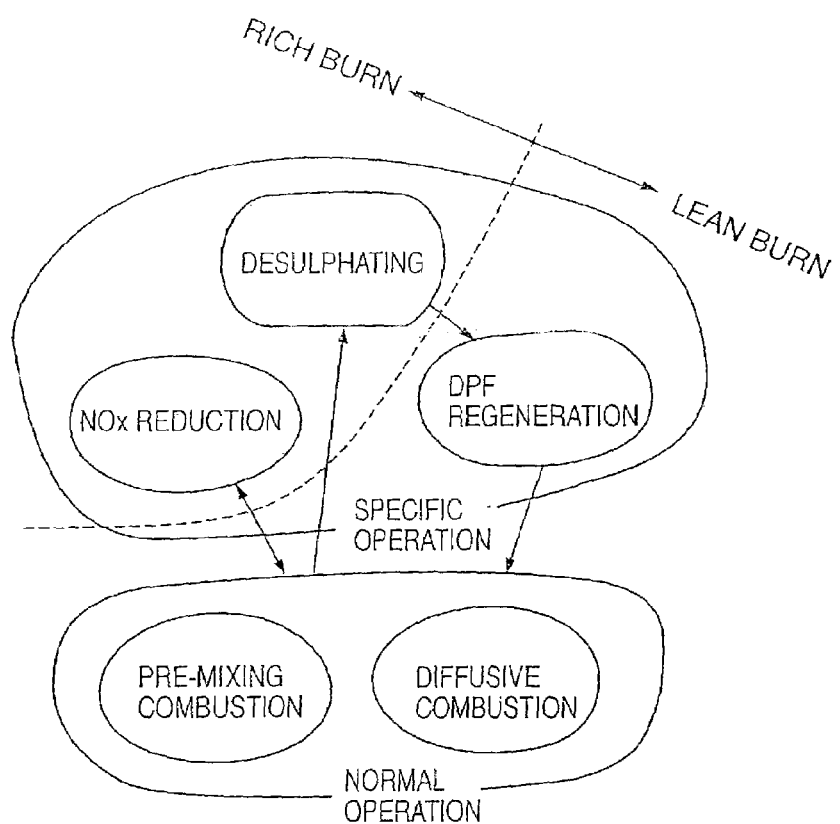
FIG. 3 is a diagram describing a relation between engine operation conditions, combustion type, and air-fuel ratio.

Referring now to FIG. 3, the operation of the diesel engine 1 for reduction of NOx, desulphating and burning PM is performed only when various conditions are satisfied. In the following description, the engine operations for these specific purposes are generically termed specific operations.

On the other hand, the conditions under which the diesel engine 1 carries out pre-mixing combustion or diffusive combustion under a lean air-fuel ratio are referred to as normal operation. Operation by combustion of an air-fuel mixture of a lean air-fuel ratio in the diesel engine 1 is referred to as a lean burn operation, and combustion of an air-fuel mixture of a rich air-fuel ratio is referred to as a rich burn operation.

If reduction of NOx is needed during normal operation, NOx reduction by a rich burn operation will be performed as a specific operation, and the engine will return to normal operation by lean burn operation after completion of the operation. If desulphating is needed during normal operation, desulphating by an engine operation with the stoichiometric air-fuel ratio will be performed as a specific operation, combustion of PM by an engine operation with a slightly lean air-fuel ratio will then be performed as a specific operation, and the engine will return to normal operation after completion of the operation.

In control of the excess air factor during lean burn operation, air-based control is applied, and during rich burn operation and an engine operation at the stoichiometric air-fuel ratio, fuel based control is applied.

Further, the fuel injection timing is also controlled to suit the combustion type.

The above excess air factor and fuel injection control performed by the controller 31 are summarized in Table 1.

When there is a change-over to rich burn operation or stoichiometric air-fuel ratio operation from lean burn operation or vice-versa, the controller 31 performs delay processing on a target fuel injection timing basic value and a target excess air factor basic value.

Now, the difference between air-based control and fuel-based control will be described.

The target excess air factor and target EGR rate are given by the following Equations (1) and (2).

$$Tlamb = \frac{Gac}{Gfc \cdot BLAMB\#} \quad (1)$$

$$EGRr = \frac{Gegr}{Gac} \cdot 100 \quad (2)$$

where, Tlamb=target excess air factor,
Gac=target cylinder intake air amount,
Gfc=target fuel injection amount,
EGRr=target EGR rate,
Gegr=target EGR amount, and
BLAMB#=stoichiometric air-fuel ratio=14.7.

Also in both air-based control and fuel-based control, the target excess air factor Tlamb and the target EGR rate EGRr are applied as control target values respectively.

In fuel-based control, the target fuel injection amount Gfc is calculated based on an accelerator pedal depression amount APS representing the engine load, and the engine rotation speed Ne.

The target cylinder intake air amount Gac is calculated by Equation (1) from the target fuel injection amount Gfc and the target excess air factor Tlamb.

The target EGR rate EGRr and target cylinder intake air amount Gac are then substituted into equation (2) to calculate the target exhaust gas recirculation amount Gegr. This control process is basically the same as the control method disclosed by the above-mentioned U.S. Pat. No. 6,247,311.

On the other hand, in air-based control, the measured intake fresh air amount is considered as the target cylinder intake air amount Gac, and the target fuel injection amount Gfc is calculated from the target cylinder intake air amount Gac and target excess air factor.

The target cylinder intake air amount Gac and the target EGR rate EGRr are substituted into equation (2) to calculate the target EGR amount Gegr.

To perform the above control, detection data are input to the controller 31 from an accelerator pedal depression sensor 32 which detects the depression amount APS of an accelerator pedal with which the vehicle is provided, a crank angle sensor 33 which detects the rotation speed Ne and a crank angle of the diesel engine 1, and an air flow meter 35 which detects a flowrate of the fresh air supplied from the compressor 23 to the intake passage 3. The controller 31 comprises a microcomputer equipped with a central processing unit (CPU), read-only memory (ROM), random access memory (RAM) and I/O interface (I/O interface). It is also possible to construct the controller 31 from plural microcomputers.

Figure 4:
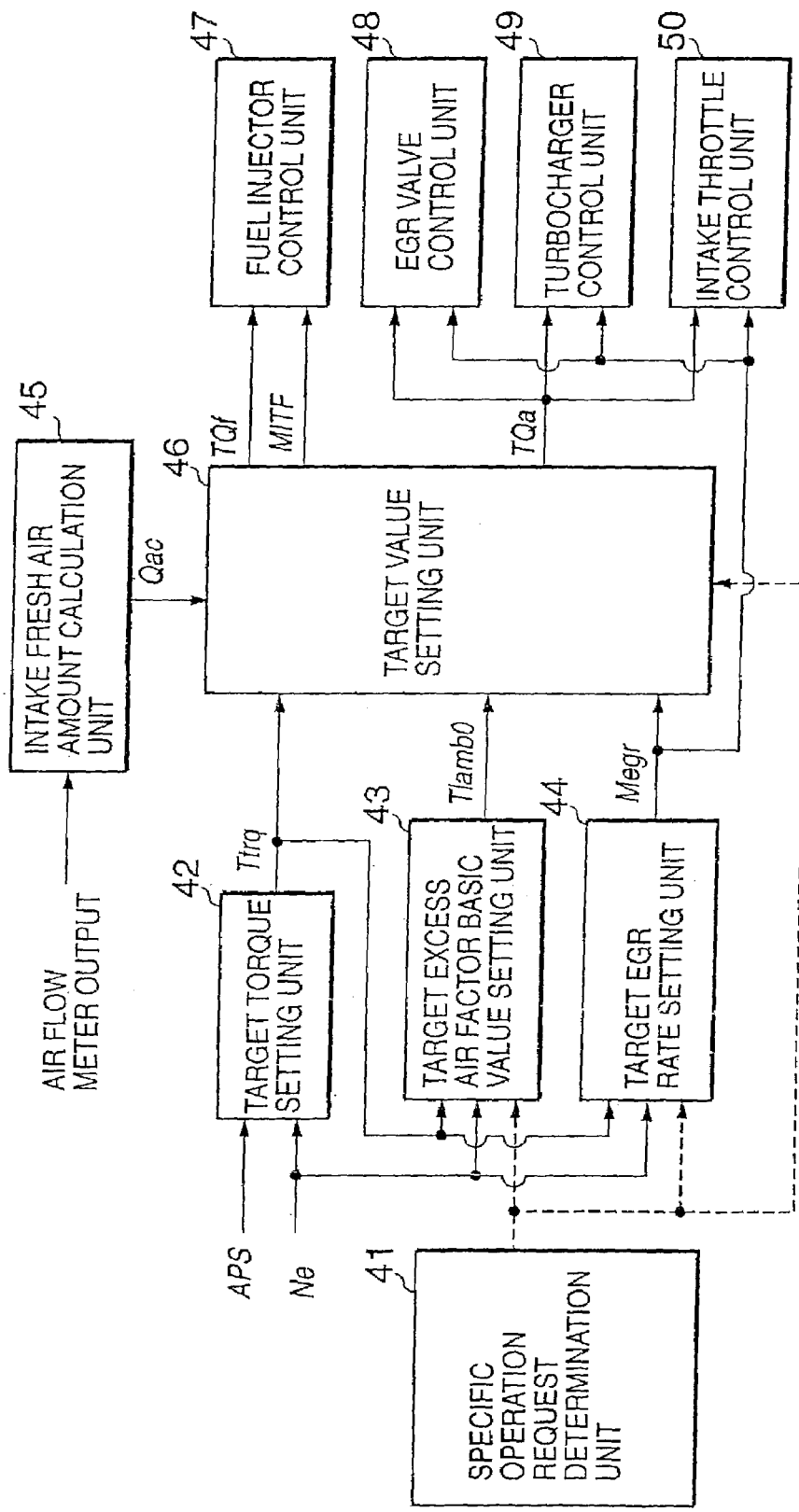
FIG. 4 is a block diagram describing the function of a programmable controller according to this invention.

Next, the functions of the controller 31 for performing the above-mentioned control will be described, referring to FIG. 4.

The controller 31 is provided with a specific operation request determination unit 41, a target torque setting unit 42, a target excess air factor basic value setting unit 43, a target EGR rate setting unit 44, an intake fresh air amount calculation unit 45, a target value setting unit 46, a fuel injector control unit 47 an EGR valve control unit 48, a turbocharger control unit 49 and an intake throttle control unit 50.

These units are virtual units for describing the functions of the controller 31, and do not exist physically.

The specific operation request determination unit 41 determines the NOx trap amount of the NOx catalyst 28A of the exhaust gas processor 28, and a sulphur poisoning amount based on the operating time of the diesel engine 1.

That is, when the cumulative operating time of the diesel engine 1 after performing NOx reduction reaches a predetermined time, it is determined that the NOx trap amount is saturated.

Similarly, when the cumulative operating time of the diesel engine 1 after performing desulphating reaches a predetermined time, it is determined that the sulphur poisoning amount has reached the limit.

The specific operation request determination unit 41, based on these determination results, selects the operation type of the diesel engine 1 from among the normal operation, NOx reduction, desulphating and regeneration of the DPF 28B.

Herein, the regeneration of the DPF 28B is always performed after desulphating.

Figure 13:
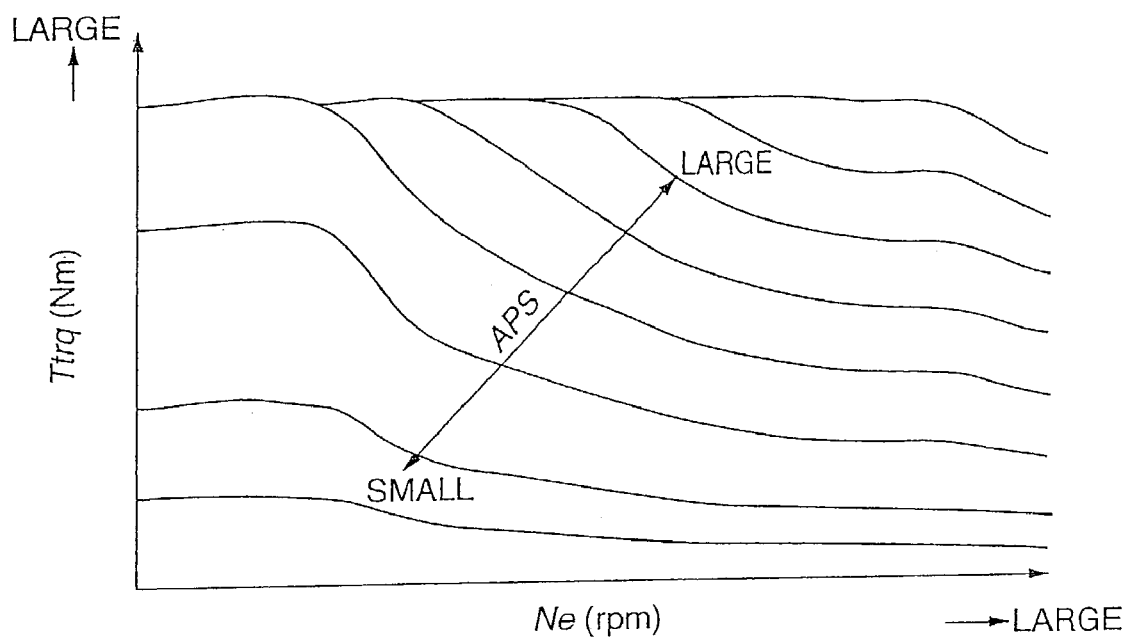
FIG. 13 is a diagram showing the characteristics of a map of a target engine output torque Ttrq stored by the controller.

The target engine torque setting unit 42 calculates a target output torque Ttrq of the diesel engine 1 by looking up a map having the characteristics shown in FIG. 13 based on the accelerator pedal depression amount APS and the engine rotation speed Ne.

The target excess air factor basic value setting unit 43 sets a target excess air factor basic value Tlamb0 by the following process.

Figure 14:
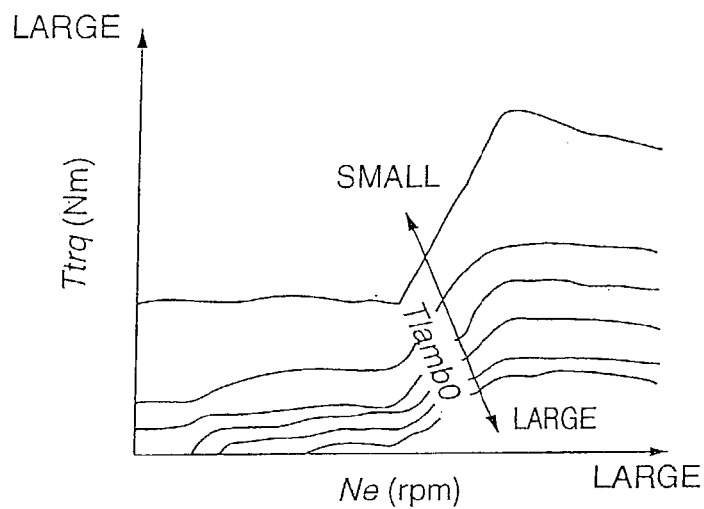
FIG. 14 is a diagram showing the characteristics of a map of a target excess air factor basic value Tlamb0 stored by the controller.

(1) During normal operation, the target excess air factor basic value Tlamb0 is calculated by looking up a map having the characteristics shown in FIG. 14 from the target engine output torque Ttrq and the engine rotation speed Ne. Tlamb0 calculated here is a larger value than 1.4.

(2) During a specific operation, the target excess air factor basic value Tlamb0 is set as a value which is predefined according to the type of the operation.

Specifically in the NOx reduction, Tlamb0 is set to a value smaller than 1.0.

In the desulphating process, Tlamb0 is set to 1.0.

In the regeneration of DPF 28B, Tlamb0 is set to a slightly larger value than 1.0.

Figure 15:
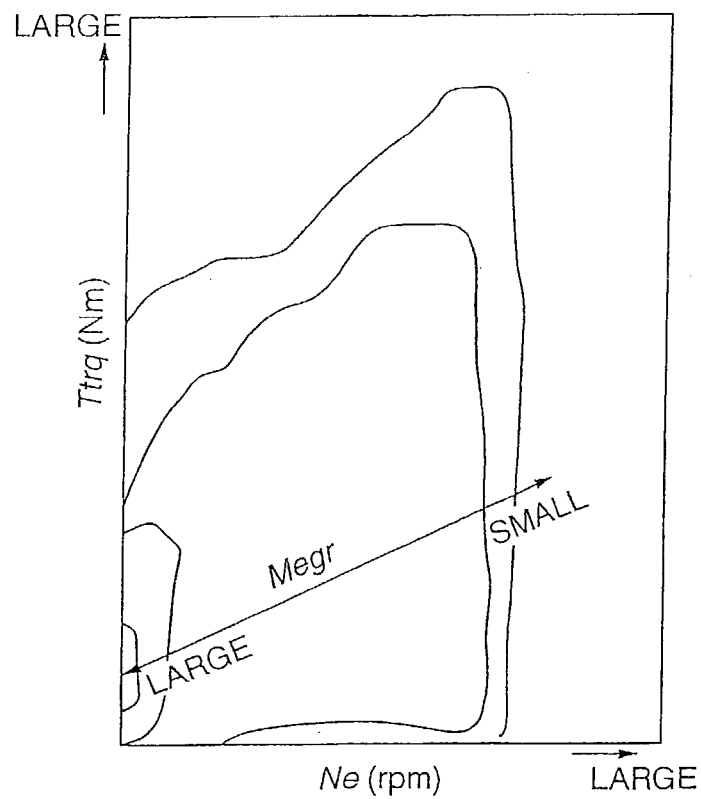
FIG. 15 is a diagram showing the characteristics of a map of a target EGR rate Megr stored by the controller.

The target EGR rate setting unit 44 calculates the target EGR rate Megr by looking up a map having the characteristics shown in FIG. 15 from the target engine output torque Ttrq and the engine rotation speed Ne.

The target EGR rate Megr is held at the same value even when operation of the diesel engine 1 changes over from normal operation to a specific operation as long as the target engine output torque Ttrq and engine rotation speed Ne remain unchanged. The intake fresh air mount calculation unit 45 calculates the intake fresh air amount Qac per stroke of a cylinder by adding processing for dead time and a first order delay to the air flowrate detected by the air flow meter 35.

The method of calculating the fresh air intake amount Qac from the detection flowrate of the air flow meter 35 is known from U.S. Pat. No. 5,964,820.

The target value setting unit 46 sets the target fresh air amount TQa, target fuel injection amount TQf and target fuel injection timing MITF so that the target excess air factor basic value Tlamb0 set by the target excess air factor basic value setting unit 43 may be realized.

This function of the target value setting unit 46 will now be described in detail, referring to FIG. 5.

Figure 5:
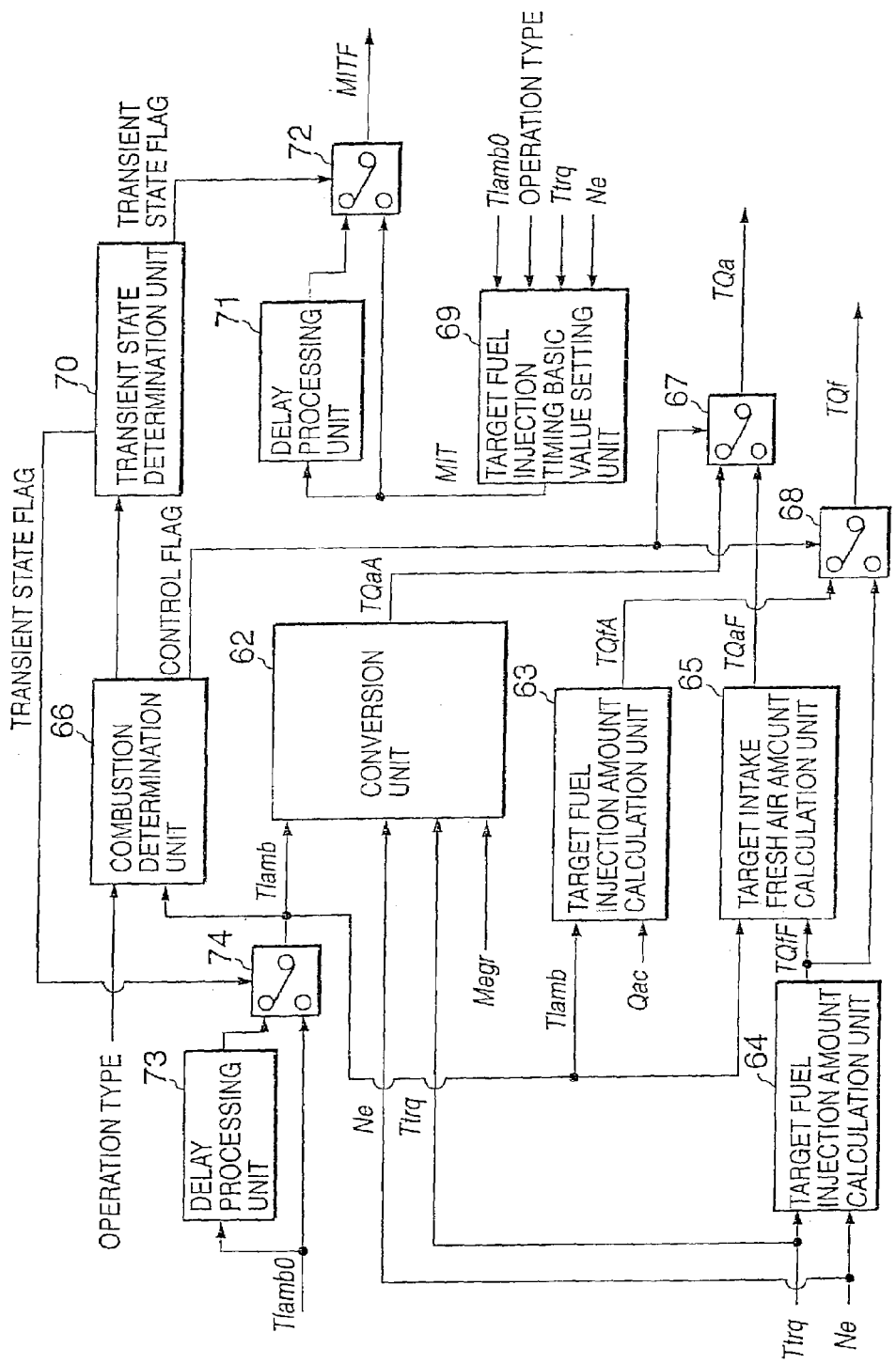
FIG. 5 is a block diagram describing a process for calculating a target fresh air amount, a target fuel injection amount and a target fuel injection timing performed by the controller.

FIG. 5 shows the internal construction of the target value setting unit 46.

The units 62–74 shown in the drawing are also virtual units for describing the function of the target value setting unit 46.

The delay processing unit 73 weight averages the target excess air factor basic value Tlamb0.

When a control flag which will be described later is zero, the switch 74 sets the target excess air factor Tlamb equal to the target excess air factor basic value Tlamb0.

When the control flag is unity, the weighted average value calculated by the delay processing unit 73 is set as the target excess air factor Tlamb.

The conversion unit 62 and the target fuel injection amount calculation unit 63 calculate a target fresh air amount TQaA and target fuel injection amount TQfA in air-based excess air factor control.

Figure 11:
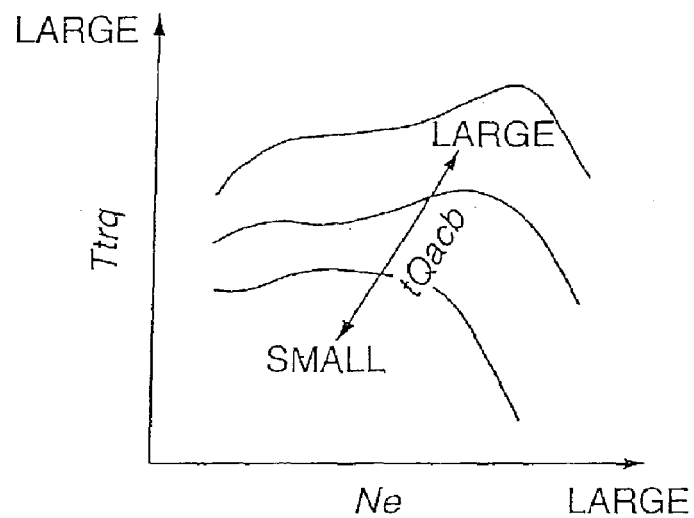
FIG. 11 is a diagram showing the characteristics of a map of a target fresh air basic value amount tQacb stored by the controller.

The conversion unit 62 converts the target excess air factor Tlamb into the target fresh air amount TQaA taking account of the exhaust gas recirculation amount. For this purpose, the conversion unit 62 first calculates the target fresh air amount basic value tQacb by looking up a map having the characteristics shown in FIG. 11 from the target engine torque Ttrq set by the target engine torque setting unit 42, and the engine rotation speed Ne.

Figure 12:
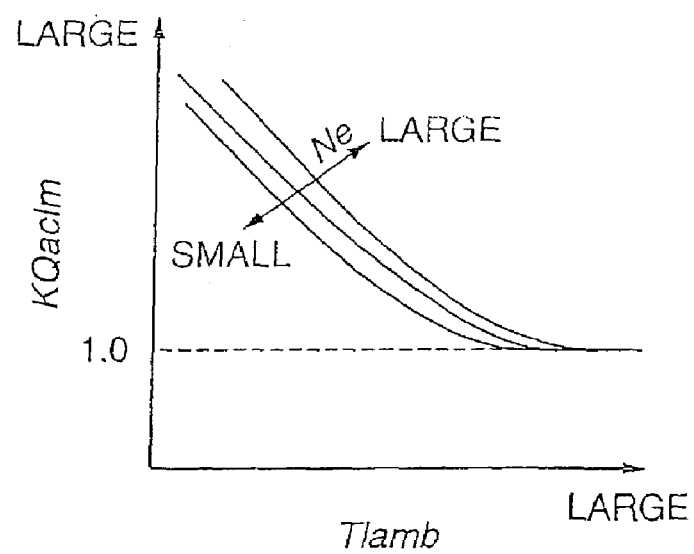
FIG. 12 is a diagram showing the characteristics of a map of an excess air factor conversion coefficient kQaclm stored by the controller.

A conversion coefficient kQaclm used for the conversion of the excess air factor to the intake fresh air amount is also calculated from the target excess air factor Tlamb and the engine rotation speed Ne by looking up a map having the characteristics shown in FIG. 12.

The target fresh air amount TQaA in air-based control is calculated by the next Equation (3) using these values.

$$TQaA = \frac{tQacb}{1 + Megr} \cdot kQaclm \qquad (3)$$

where, $\frac{1}{1 + Megr}$ = correction coefficient of EGR amount.

The target fuel injection amount calculation unit 63 calculates the target fuel injection amount TQfA in air-based control by the next Equation (4) from the target excess air factor Tlamb and intake fresh air amount Qac.

$$TQfA = \frac{Qac}{Tlamb \cdot BLAMB\#} \qquad (4)$$

On the other hand, the target fuel injection amount calculation unit 64 and the target intake fresh air amount calculation unit 65 calculate the target fuel injection amount TQfF and target fresh air amount TQaF in fuel-based control.

Figure 16:
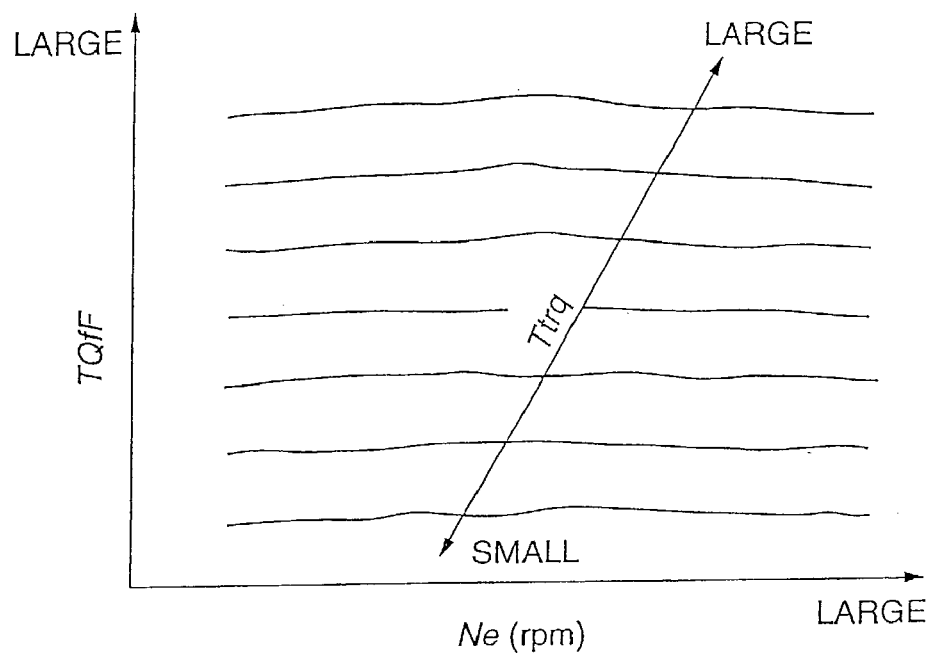
FIG. 16 is a diagram showing the characteristics of a map of a target fuel injection amount TQfF in fuel-based control stored by the controller.

The target fuel injection amount calculation unit 64 calculates the target fuel injection amount TQfF of fuel-based control by looking up a map having the characteristics shown in FIG. 16 from the target engine torque Ttrq and the engine rotation speed Ne.

The target intake fresh air amount calculation unit 65 calculates the target fresh air amount TQaF in fuel-based control by the next Equation (5) from the target fuel injection amount TQfF and the target excess air factor Tlamb.

$$TQaF = Tlamb \cdot TQfF \cdot BLAmB\# \qquad (5)$$

The combustion determination unit 66 and switches 67, 68 selectively apply air-based control or fuel-based control according to the determination results as to which of the lean burn operation, rich burn operation, or stoichiometric air-fuel ratio operation is to be applied.

The combustion determination unit 66 determines as to which of lean burn operation, rich burn operation, or the stoichiometric air-fuel ratio operation should be applied from the target excess air factor Tlamb and the determination result of the specific operation request determination unit 41.

When lean burn operation should be applied, the control flag is set to unity.

When rich burn operation or stoichiometric air-fuel ratio operation should be applied, the control flag is set to zero.

Referring again to Table 1 here, the control flag will be unity during regeneration of the DPF 28B and during normal operation.

The control flag is set to zero during NOx reduction and desulphating.

Switches 67, 68 respond to the control flag. When the control flag is unity, the switch 67 outputs the target fresh air amount TQaA in air-based control as the target fresh air amount TQa, and when the control flag is zero, the target fresh air amount TQaF in fuel-based control is output as the target fresh air amount TQa.

When the control flag is unity, the switch 68 outputs the target fuel injection amount TQfA in air-based control as the target fuel injection amount TQf, and when the control flag is zero, the target fuel injection amount TQfF in fuel-based control is output as the target fuel injection amount TQf.

The target fuel injection timing basic value setting unit 69 sets the target fuel injection timing basic value MIT as follows according to the target excess air factor basic value Tlamb0 and the determination result of the specific operation request determination unit 41.

Figure 17:
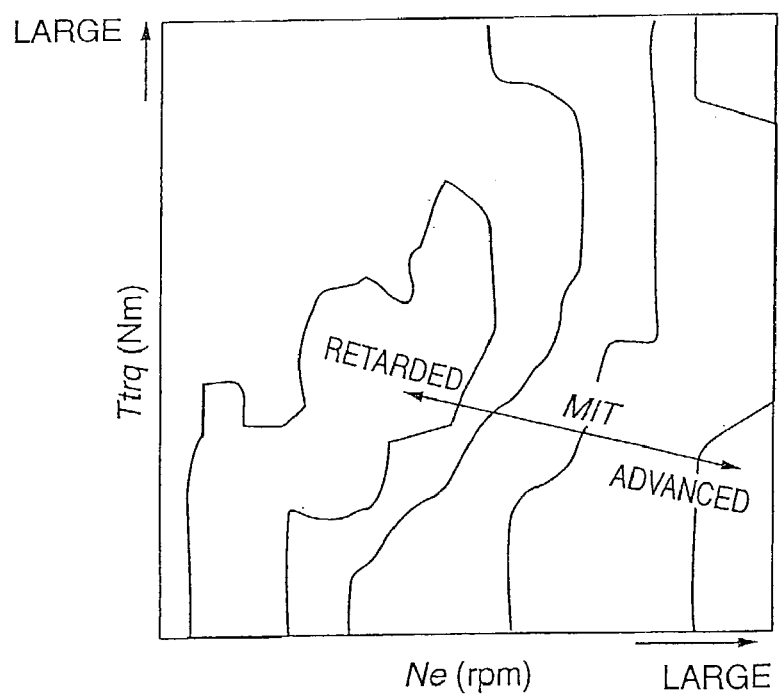
FIG. 17 is a diagram showing the characteristics of a map of a target fuel injection timing basic value MIT stored by the controller.

(1) When the determination result of the specific operation request determination unit 41 is normal operation, the target fuel injection timing basic value MIT is calculated by looking up a map having the characteristics shown in FIG. 17 from the target engine torque Ttrq and the engine rotation speed Ne.

(2) When the determination result of the specific operation request determination unit 41 is regeneration of the DPF 28B, the target fuel injection timing basic value MIT is selectively set according to the operating range A or B shown in FIG. 2.

(3) When the determination result of the specific operation request determination unit 41 is NOx reduction or desulphating, a value obtained by advancing 10 to 15 degrees from normal operation is set as the target fuel injection timing basic value MIT.

In the following cases where the air-fuel ratio varies, the transient state determination unit 70 sets a transient state flag for performing delay processing on the target fuel injection timing basic value MIT and the target excess air factor basic value Tlamb0, i.e., (1) change-over from normal operation to NOx reduction operation, (2) change-over from NOx reduction operation to normal operation, (3) change-over from normal operation to desulphating operation, and (4) change-over from regeneration of DPF 28B to normal operation.

The transient state determination unit 70 determines whether the present operation conditions correspond to the transient conditions of the above-mentioned cases (1)–(4) based on the control flag output by the combustion determination unit 66.

When the conditions correspond to one of the transient conditions, it sets the transient state flag to unity over a fixed period.

When the conditions do not correspond to one of the transient conditions, it sets the transient state flag to zero.

The delay processing unit 71 weight averages the target injection timing basic value MIT.

When the transient state flag is zero, the switch 72 sets the target fuel injection timing MITF equal to the target injection timing basic value MIT calculated by the target fuel injection timing basic value setting unit 69.

When the transient state flag is unity, the switch 72 sets the target fuel injection timing MITF equal to the value calculated by the delay processing unit 71.

In this way, the target value calculation unit 46 calculates the target fuel injection amount TQf and the target fuel injection timing MITF.

Referring again to FIG. 4, the fuel injector control unit 47 outputs a fuel injection signal which has a pulse width according to the target fuel injection amount TQf to the fuel injector 17 at a timing which coincides with the target fuel injection timing MITF.

The EGR valve control unit 48 calculates a target valve opening based on the target fresh air amount TQa and target EGR rate Megr set by the target EGR rate setting unit 44, converts the target valve opening into a duty signal, and outputs it to the EGR valve 6.

The turbocharger control unit 49 calculates the target opening of the variable nozzle 24 based on the target fresh air amount TQa and target EGR rate Megr, and outputs a corresponding signal to the pressure control valve 27.

The intake throttle control unit 50 calculates the target opening of the intake throttle 8 based on the target fresh air amount TQa and target EGR rate Megr, and outputs a corresponding signal to the pressure control valve 37.

Next, the effect of the above control performed by the controller 31 on the excess air factor and engine output torque will be described referring to FIGS. 6A–6G, 7A–7G, 8A–8E, 9A–9E, and 10A–10E.

FIGS. 6A–6G shows the variation of the excess air factor under fuel-based control, and FIGS. 7A–7G show the variation of the excess air factor under air-based control.

In order to simplify the explanation here, the target EGR rate Megr is set constant and it is assumed that delay processing is omitted.

Figure 6:
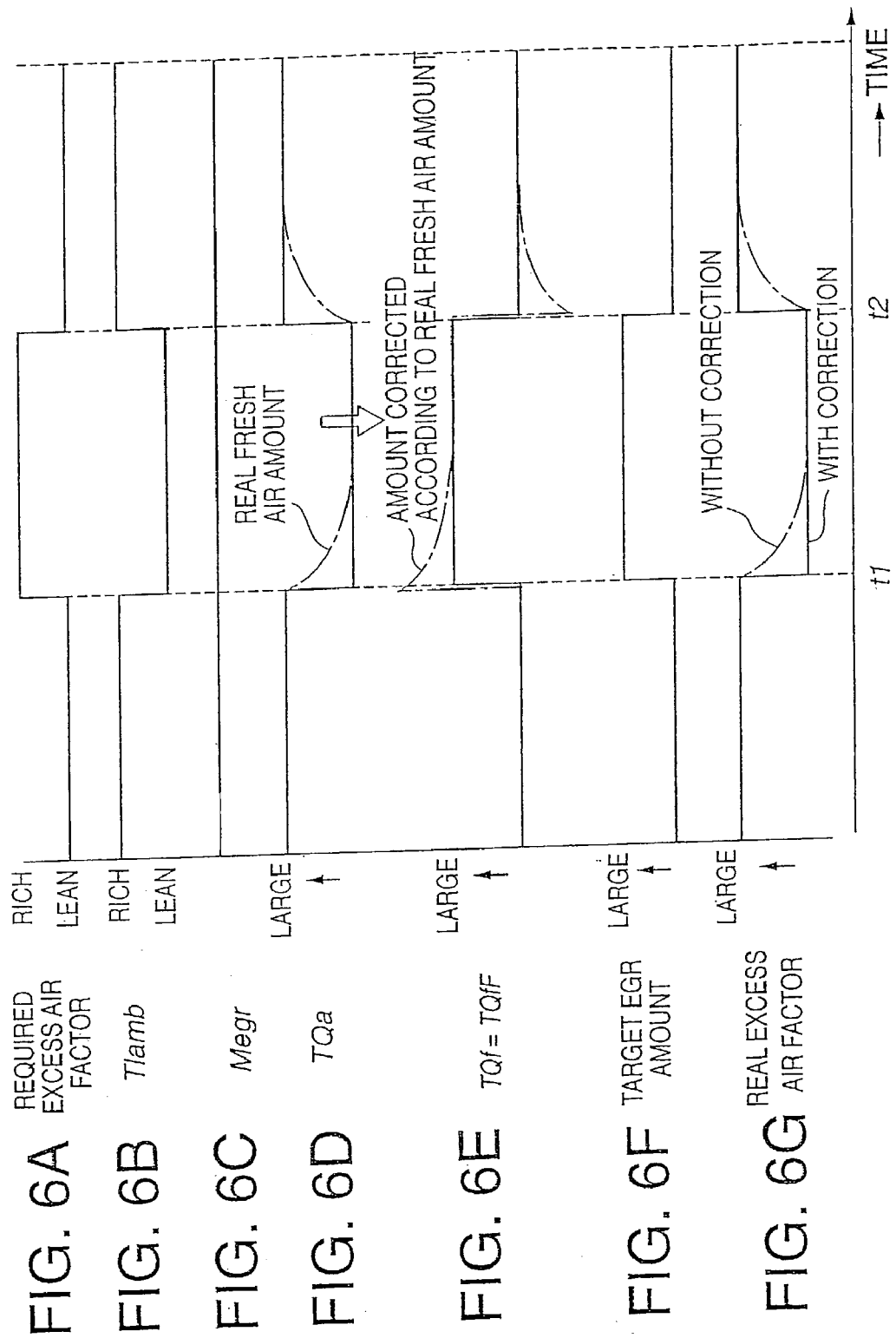
FIGS. 6A–6G are timing charts describing a fuel-based control of an excess air factor.

If the specific operation request determination unit 41 determines NOx reduction at the time t1 of FIG. 6A in the normal operation of the diesel engine 1, the required excess air factor varies from lean to rich. Accordingly, the target excess air factor basic value setting unit 43 immediately changes the target excess air factor basic value Tlamb0 from lean to rich. As a result, the target excess air factor Tlamb is varied from lean to rich, as shown in FIG. 6B.

On the other hand, in the target value calculation unit 46, the target fuel injection amount TQfF of the fuel-based control calculated by the target fuel injection amount calculation unit 64 is set as the target fuel injection amount TQf. Also, the target fresh air amount TQaF in the fuel-based control calculated by the target intake fresh air amount calculation unit 65 based on TQfF is set as the target fresh air amount TQa.

As there is no response delay in fuel injection amount control, the fuel injection amount increases immediately, but since control of the intake fresh air amount is accompanied by a time delay, the actual intake fresh air amount shows a first order delay relative to change of the target fresh air amount TQa, as shown by the dashed line of FIG. 6D.

Consequently, a real excess air factor also shows a change with a first order delay, as shown by the dashed line of FIG. 6G, and a considerable time is required until the target excess air factor is realized.

By adding a delay compensation to the target fuel injection amount TQ as shown by the dashed line of FIG. 6E, the excess air factor may vary with high response as shown by the straight line of FIG. 6G. However, as the delay characteristics of the intake air amount largely change with the operation conditions, it is difficult to compensate the delay under various operating conditions with sufficient accuracy.

Figure 7:
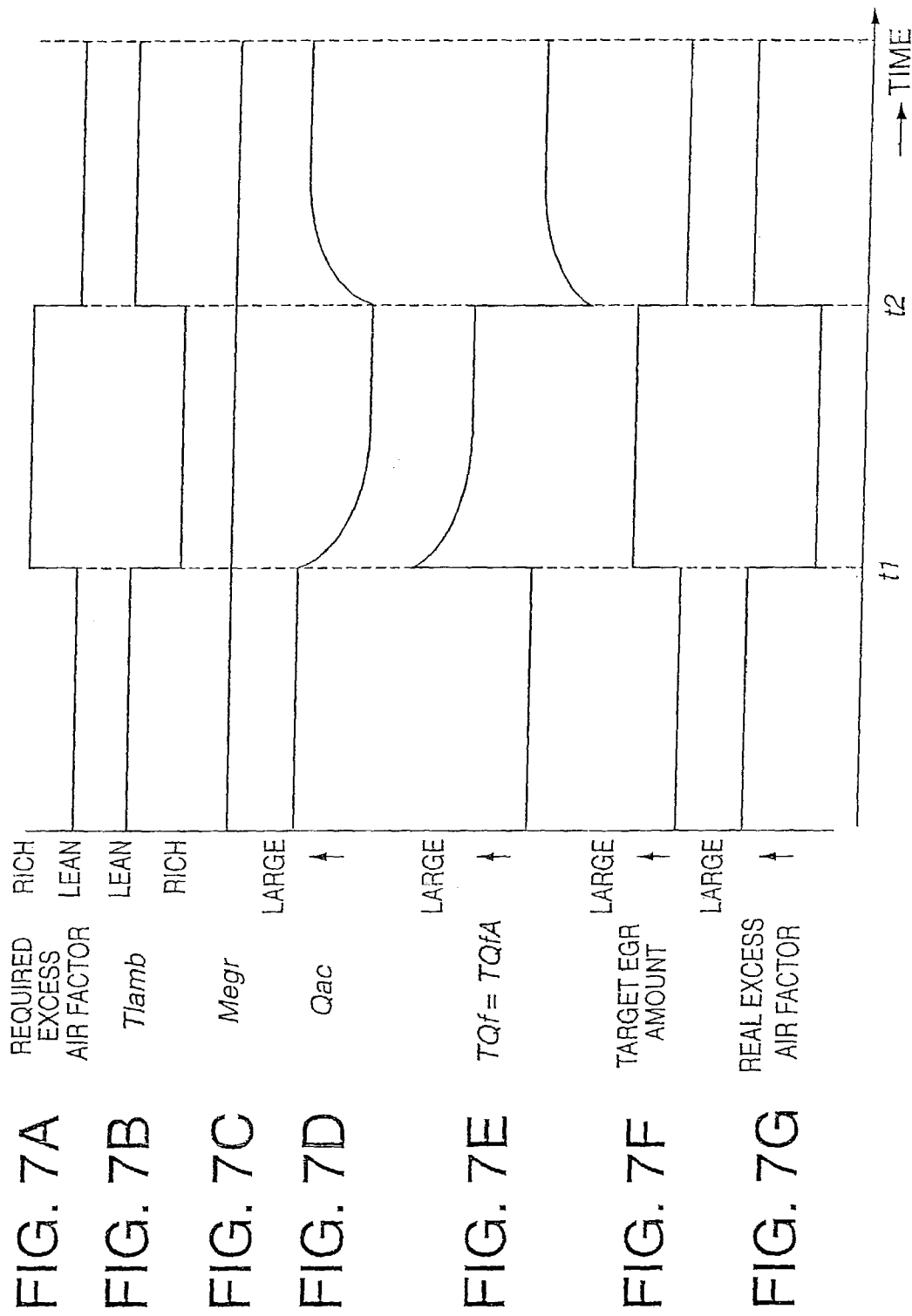
FIGS. 7A–7G are timing charts describing an air-based control of the excess air factor.

On the other hand, if the required excess air factor varies from lean to rich also in air-based control as shown in FIG. 7A, the target excess air factor Tlamb is varied from lean to rich immediately, as shown in FIG. 7B.

In the target value calculation unit 46, the conversion unit 62 calculates the target fresh air amount basic value tQacb.

The target fuel injection amount calculation unit 63 calculates the target fuel injection amount TQfA in fuel-based control relative to variation of the target fresh air amount basic value tQacb, target excess air factor Tlamb and fresh air intake amount Qac, and sets the target fuel injection amount TQfA as the target fuel injection amount TQf.

In this case, as the target fuel injection amount TQf is determined according to the fresh air intake amount Qac, it is not necessary to take account of the time delay in the change of the intake fresh air amount, and the excess air factor follows the target excess air factor without delay.

Next, FIGS. 8A–8E show the change of the output torque of the diesel engine 1 under fuel-based excess air factor control, and FIGS. 9A–9E show the change of the output torque of the diesel engine 1 under air-based excess air factor control.

Figure 8:
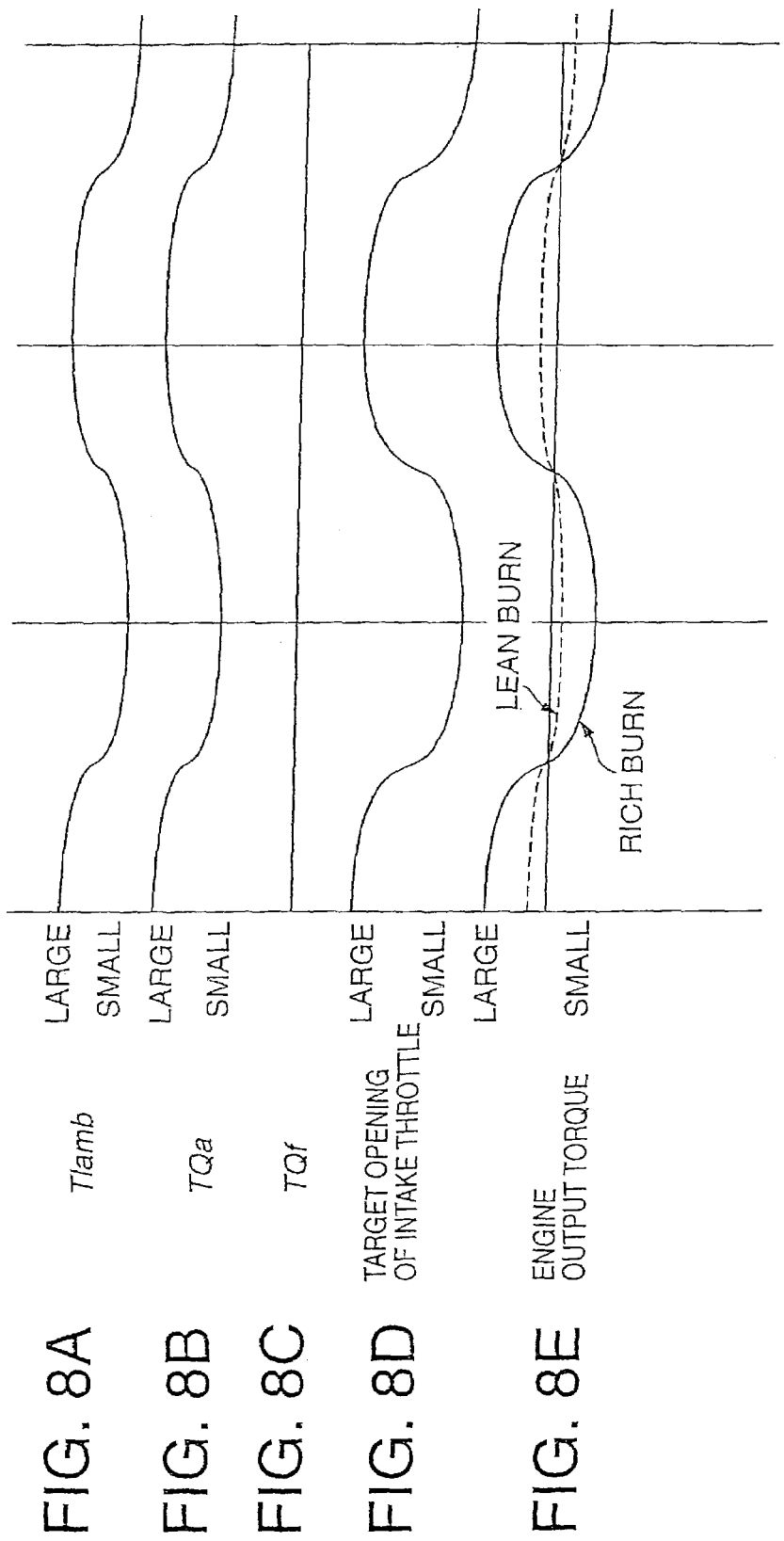
FIGS. 8A–8E are timing charts describing a fuel-based control of an engine output torque.
Figure 9:
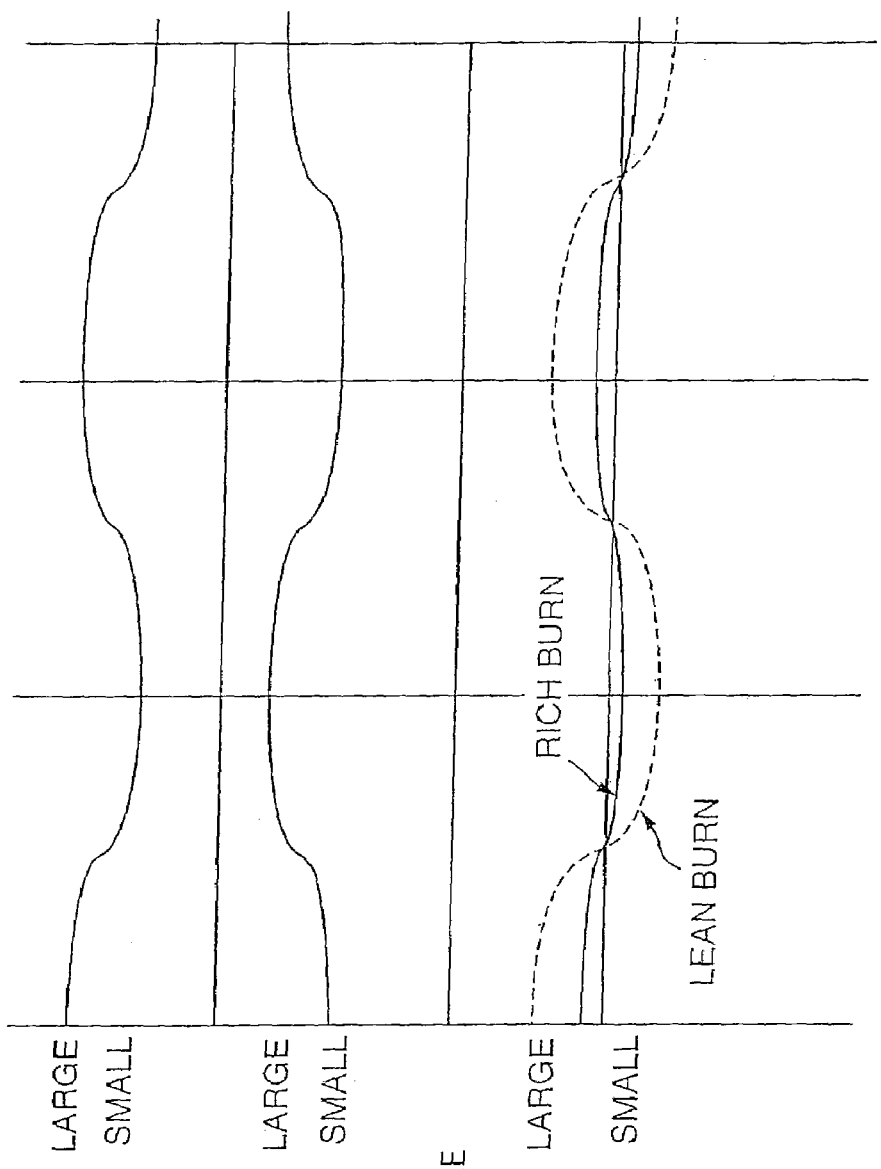
FIGS. 9A–9E are timing charts describing an air-based control of the engine output torque.

The case where the target excess air factor fluctuates periodically at a fixed interval will be considered, as shown in FIGS. 8A and 9A.

In fuel-based excess air factor control, with change of the target excess air factor, the target fresh air amount TQa varies as shown in FIG. 8B, and the target fuel injection amount TQf does not vary as shown in FIG. 8C. The change of the target fresh air amount TQa brings about a change of the target opening of the intake throttle 18, as shown in FIG. 8D.

In lean burn operation, the output torque of the diesel engine 1 varies depending on the fuel amount.

In rich burn operation, the output torque of the diesel engine 1 varies depending on the intake fresh air amount.

Therefore, as shown in FIG. 8B, when the target fresh air amount TQa varies, in a lean burn operation, the output torque does not vary much as shown by the dashed line of FIG. 8E, but in a rich burn operation, the output torque varies considerably as shown by the solid line of the figure.

In air-based excess air factor control, the target fresh air amount TQa does not vary with change of the target excess air factor, as shown in FIG. 9B, therefore the target opening of the intake throttle 18 does not vary either.

On the other hand, the target fuel injection amount TQf does vary, as shown in FIG. 9C.

In lean burn operation, the change of the target fuel injection amount TQf has a large effect on engine output torque, as shown by the dashed line of FIG. 9E, and in a rich environment, it does not vary much as shown by the solid line of the figure.

Now, in the excess air factor control device according to this invention, the combustion determination unit 66 and switches 67, 68 shown in FIG. 5 apply fuel-based excess air factor control during a lean burn operation, and apply air-based excess air factor control during a rich burn operation.

Therefore, the excess air factor can be controlled with sufficient response without causing change of engine output torque during a rich burn operation or during a lean burn operation.

Referring to FIGS. 10A–10E, if the specific operation request determination unit 41 determines a change-over to NOx reduction from normal operation, and the target excess air factor Tlamb varies from lean to rich at the time t1, in the excess air factor control device according to this invention, the excess air factor is controlled in a rich burn operation by air-based control.

Figure 10:
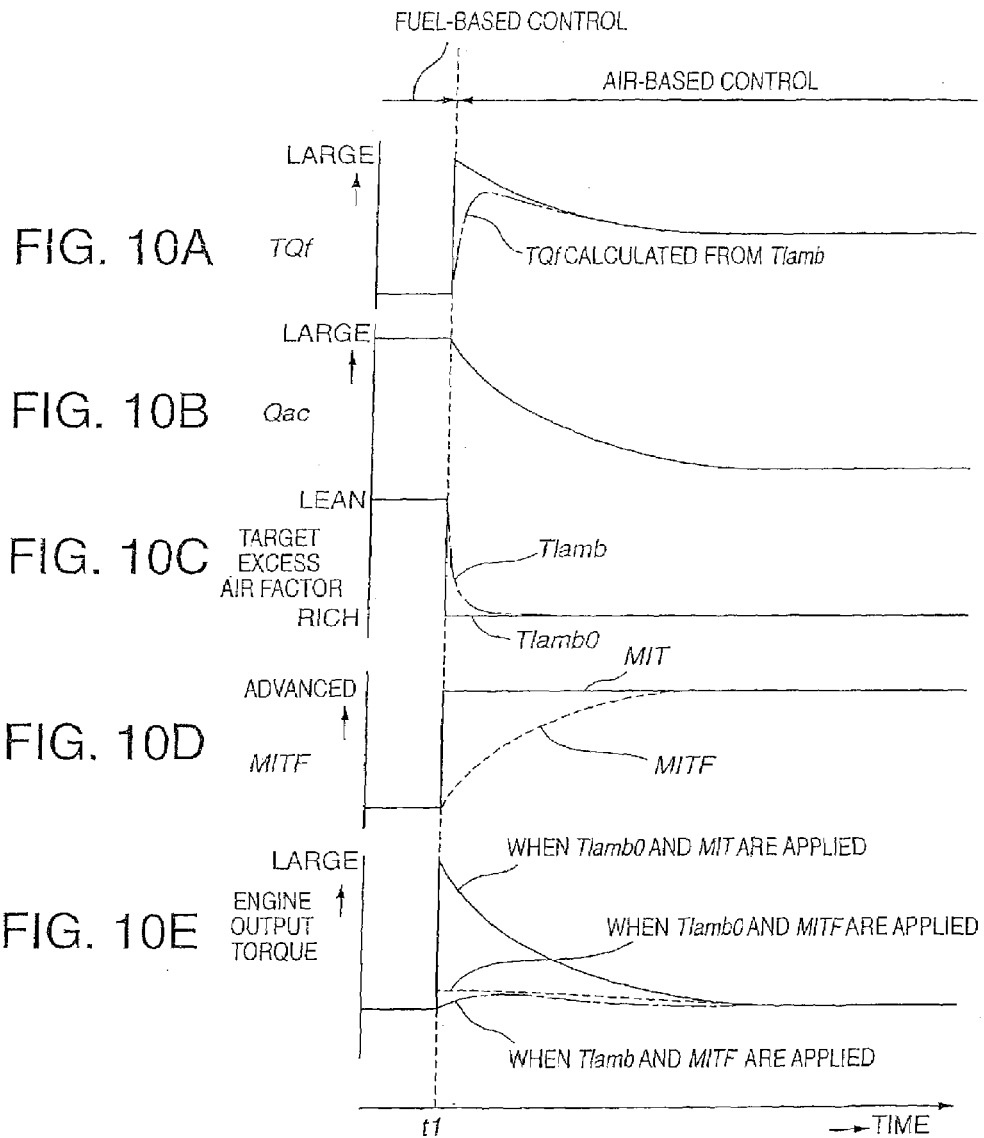
FIGS. 10A–10E are timing charts describing a change of the engine output torque when switching from lean burn operation to rich burn operation under the excess air factor control according to this invention.

At this time, if the target excess air factor Tlamb varies in stepwise fashion like the target excess air factor basic value Tlamb0 as shown by the solid line of FIG. 10C, the output torque of the diesel engine 1 will change suddenly as shown in FIG. 10E.

However, in the excess air factor control device according to this invention, the transient state determination unit 70 shown in FIG. 5 sets the transient state flag to unity. Accordingly, the switch 74 sets the target excess air factor Tlamb to be equal to the value processed by the delay processing unit 73 until a fixed time has elapsed from the time t1.

Therefore, the target excess air factor Tlamb0 varies in a stepwise manner, but the target excess air factor Tlamb varies with a gentle slope, as shown by the broken line of FIG. 10C.

Consequently, variation of the output torque of the diesel engine 1 at the time t1 is considerably suppressed, as shown by the dashed line of FIG. 10E.

Moreover, with respect to the target fuel injection timing MITF, the switch 72, in response to the transient state flag, sets the target fuel injection timing MITF to be equal to the value processed by the delay processing unit 71 until a fixed time has elapsed from the time t1.

Consequently, change of the output torque of the diesel engine 1 at the time t1 is further suppressed, as shown by the dashed line of FIG. 10E.

Although FIGS. 10A–10E is the case where the target excess air factor Tlamb varies from lean to rich, the output torque of the diesel engine 1 will change suddenly also if the excess air factor Tlamb changes suddenly when the target excess air factor Tlamb varies from rich to lean.

Also in this case, since delay processing is performed on the target excess air factor basic value Tlamb0 to obtain the target excess air factor Tlamb as well as on the target fuel injection timing basic value MIT to obtain the target fuel injection timing MITF in response to the transient state flag of unity, the change of the output torque of the diesel engine 1 is suppressed small.

It is possible to maintain the response of excess air factor control and that of engine output torque control respectively at desirable levels by appropriately setting the time constant applied by the delay processing units 71 and 73.

According to this excess air factor control device, therefore, generation of torque shock at the time of switching between lean burn operation, rich burn operation or stoichiometric air-fuel ratio operation can be prevented.

The contents of Tokugan 2001-282638, with a filing date of Sep. 18, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above-described embodiment, the diesel engine 1 is provided with a variable capacity turbocharger 21 provided with a variable nozzle 24.

However, it is also possible to use a turbocharger provided with a mechanism which varies the aperture of a scroll or diffuser instead of the variable nozzle 24.

The turbocharger provided with such a regulating mechanism is generically termed a variable geometry turbocharger. This invention is applicable to diesel engines provided with all types of variable geometry turbocharger.

Furthermore, it is applicable also to a diesel engine provided with a combination of a fixed capacity turbocharger and a waist gate valve.

When using a variable geometry turbocharger, the turbocharger control unit 49 controls the aperture area of the turbocharger to the area corresponding to the target fresh air amount TQa.

When using a fixed capacity turbocharger provided with a waist gate valve, the turbocharger control unit 49 controls the valve opening of the waist gate valve to the opening corresponding to the target fresh air amount TQa.

INDUSTRIAL FIELD OF APPLICATION

As mentioned above, during lean burn operation of the diesel engine, this invention applies fuel-based excess air factor control, and during rich burn operation, it applies air-based excess air factor control.

Therefore, in the diesel engine for vehicles which normally performs a lean burn operation while performing a rich burn operation for the regeneration of the NOx reduction catalyst, the accuracy and response of the excess air factor control is increased while preventing the engine output torque from changing.

The embodiments of this invention in which an exclusive property or privilege is claimed are defined as follows:

TABLE 1

| Operation | Pre-mixing combustion | Diffusive combustion | Regeneration of DPF | Reduction of NOx | De-sulphating |
|---|---|---|---|---|---|
| Air-fuel ratio | Lean | Lean | Slightly lean | Rich | Stoichiometric |
| Category | Normal operation | Normal operation | Specific operation | Specific operation | Specific operation |
| Operation range | A | B | After de-sulphating | C | Not dependent |
| Torque control | Fuel-based control | Air-based control | Fuel-based control | Air-based control | Air-based control |
| Excess air factor $\lambda$ | $\lambda > 1.4$ | $\lambda > 1.4$ | $1.4 > \lambda > 1$ | $\lambda < 1$ | $\lambda \approx 1$ |
| EGR rate | Map value | Map value x 0.8 | Map value x 0.5 | Map value x 0.8 | 0 |
| Injection timing | 6° retarded from map value | Map value | 6° advanced from map value | 15° advanced from map value | 10° advanced from map value |

What is claimed is:

1. An excess air factor control method for a diesel engine which burns a mixture of air supplied by an air supply mechanism and fuel supplied by a fuel supply mechanism, comprising:
   detecting a running state of the diesel engine;
   setting a target excess air factor of the mixture based on the running state;
   controlling an air supply amount of the air supply mechanism to a target air supply amount calculated from a predetermined fuel supply amount that has been determined without depending on the air supply amount of the air supply mechanism and the target excess air factor when the target excess air factor is larger than a value equivalent to a stoichiometric air-fuel ratio; and
   controlling a fuel supply amount of the fuel supply mechanism to a target fuel supply amount calculated from a predetermined air supply amount that has been determined without depending on the fuel supply amount of the fuel supply mechanism and the target excess air factor when the target excess air factor is smaller than the value equivalent to the stoichiometric air-fuel ratio.

2. An excess air factor control device for a diesel engine which burns a mixture of air supplied by an air supply mechanism and fuel supplied by a fuel supply mechanism, comprising:
   means for detecting a running state of the diesel engine;
   means for setting a target excess air factor of the mixture based on the running state;
   means for controlling an air supply amount of the air supply mechanism to a target air supply amount calculated from a predetermined fuel supply amount that has been determined without depending on the air supply amount of the air supply mechanism and the target excess air factor when the target excess air factor is larger than a value equivalent to a stoichiometric air-fuel ratio; and
   means for controlling a fuel supply amount of the fuel supply mechanism to a target fuel supply amount calculated from a predetermined air supply amount that has been determined without depending on the fuel supply amount of the fuel supply mechanism and the target excess air factor when the target excess air factor is smaller than the value equivalent to the stoichiometric air-fuel ratio.

3. An excess air factor control device for a diesel engine which burns a mixture of air supplied by an air supply mechanism and fuel supplied by a fuel supply mechanism, comprising:
   a sensor which detects a running state of the diesel engine; and
   a programmable controller programmed to:
      set a target excess air factor of the mixture based on the running state;
      control an air supply amount of the air supply mechanism to a target air supply amount calculated from a predetermined fuel supply amount that has been determined without depending on the air supply amount of the air supply mechanism and the target excess air factor when the target excess air factor is larger than a value equivalent to a stoichiometric air-fuel ratio; and
      control a fuel supply amount of the fuel supply mechanism to a target fuel supply amount calculated from a predetermined air supply amount that has been determined without depending on the fuel supply amount of the fuel supply mechanism and the target excess air factor when the target excess air factor is smaller than the value equivalent to the stoichiometric air-fuel ratio.

4. The excess air factor control device as defined in claim 3, wherein the running state detecting sensor further comprises a sensor which detects a load of the diesel engine and a sensor which detects a rotation speed of the diesel engine, and the controller is further programmed, when the target excess air factor is larger than the value equivalent to the stoichiometric air-fuel ratio equivalent value, to calculate a target engine torque based on the load of the diesel engine and the rotation speed of the diesel engine, calculate a target air amount basic value based on the target engine torque and the rotation speed of the diesel engine, calculate a conversion coefficient based on the target excess air factor and the rotation speed of the diesel engine, set the predetermined air supply amount equal to a value obtained by multiplying the target air amount basic value by the conversion coefficient, and control the air supply amount of the air supply mechanism to the predetermined air supply amount.

5. The excess air factor control device as defined in claim 3, wherein the running state detecting sensor comprises a sensor which detects a load of the diesel engine and a sensor which detects a rotation speed of the diesel engine, and the controller is further programmed, when the target excess air factor is less than the value equivalent to the stoichiometric air-fuel ratio, to calculate a target engine torque based on the load of the diesel engine and the rotation speed of the diesel engine, set a predetermined fuel supply amount equal to a value calculated based on the target engine torque and the rotation speed of the diesel engine, and control the fuel supply amount of the fuel supply mechanism to the predetermined fuel supply amount.

6. The excess air factor control device as defined in claim 3, wherein the running state detecting sensor comprises the controller which is further programmed to count a running time of the diesel engine.

7. The excess air factor control device as defined in claim 3, wherein the controller is further programmed to apply delay processing to the target excess air factor when the target excess air factor varies between a value larger than the value equivalent to the stoichiometric air-fuel ratio and a value which is not larger than the value equivalent to the stoichiometric air-fuel ratio.

8. The excess air factor control device as defined in claim 3, wherein the air supply mechanism comprises a variable geometry turbocharger, and the controller is further programmed to control the air supply amount by varying a turbocharging pressure of the variable geometry turbocharger.

9. The excess air factor control device as defined in claim 3, wherein the air supply mechanism comprises an exhaust gas recirculation valve which recirculates a part of an exhaust gas of the diesel engine into the air supplied by the air supply mechanism, and the controller is further programmed to control the air supply amount by varying an exhaust gas recirculation amount of the exhaust gas recirculation valve.

10. The excess air factor control device as defined in claim 3, wherein the diesel engine comprises an intake passage, the air supply mechanism comprises an intake throttle provided in the intake passage, and the controller is further programmed to control the air supply amount by varying a throttle opening of the intake throttle.

11. The excess air factor control device as defined in claim 1, wherein the diesel engine comprises a nitrogen oxide trap catalyst which traps nitrogen oxides in an exhaust gas of the diesel engine when an excess air factor of the mixture is larger than the value equivalent to the stoichiometric air-fuel ratio, and regenerates a nitrogen oxide trap function of the nitrogen oxide trap catalyst by reducing trapped nitrogen oxides when the excess air factor of the mixture is smaller than the value equivalent to the stoichiometric air-fuel ratio, and the controller is further programmed to determine whether or not a regeneration of the nitrogen oxide trap function is required from the running state, set the target excess air factor to a value larger than the value equivalent to the stoichiometric air-fuel ratio when the regeneration is not required, and set the target excess air factor to a value less than the value equivalent to the stoichiometric air-fuel ratio when the regeneration is required.

12. The excess air factor control device as defined in claim 11, wherein the nitrogen oxide trap catalyst accumulates sulfur in the exhaust gas when the target excess air factor is larger than the value equivalent to the stoichiometric air fuel ratio, and performs a desulphating to release the accumulated sulfur when the target excess air factor is equal to the value equivalent to the stoichiometric air-fuel ratio, and the controller is further programmed to determine whether or not the desulphating is required from the running state, set the target excess air factor to a value larger than the value equivalent to the stoichiometric air-fuel ratio when the desulphating is not required, and set the target excess air factor substantially equal to the value equivalent to the stoichiometric air-fuel ratio when the desulphating is required.

13. The excess air factor control device as defined in claim 3, wherein the diesel engine comprises a particulate filter which traps a particulate matter in the exhaust gas and burns the trapped particulate matter under a predetermined lean air-fuel ratio, and the controller is further programmed to determine whether or not the trapped particulate matter is required to be burned, set the target excess air factor to a first value larger than the value equivalent to the stoichiometric air-fuel ratio when the trapped particulate matter is not required to be burned and set the target excess air factor to a second value which is larger than the value equivalent to the stoichiometric air-fuel ratio but less than the first value when the trapped particulate matter is required to be burned.

14. The excess air factor control device as defined in claim 13, wherein the controller is further programmed to determine that the trapped particulate matter is required to be burned when desulphating is required and set the target excess air factor to the second value after the diesel engine is operated with the target excess air factor substantially equal to the value equivalent to the stoichiometric air-fuel ratio.

15. The excess air factor control device as defined in claim 3, wherein the fuel supply mechanism comprises a fuel injector which injects fuel into the diesel engine, and the controller is further programmed to control a fuel injection timing of the fuel injector to a target injection timing and vary the target injection timing depending on whether or not the target excess air factor is larger than the value equivalent to the stoichiometric air-fuel ratio.

16. The excess air factor control device as defined in claim 15, wherein the controller is further programmed to apply delay processing to the target injection timing when the target excess air factor varies between a value larger than the value equivalent to the stoichiometric air-fuel ratio and a value which is not larger than the value equivalent to the stoichiometric air fuel ratio.

17. An excess air factor control device for a diesel engine which burns a mixture of air supplied by an air supply mechanism and fuel supplied by a fuel supply mechanism, comprising:
a sensor which detects a running state of the diesel engine; and
a programmable controller programmed to:
set a target excess air factor of the mixture based on the running state;
control an air supply amount of the air supply mechanism to a target air supply amount calculated from a predetermined fuel supply amount and the target excess air factor when the target excess air factor is larger than a value equivalent to a stoichiometric air-fuel ratio; and
control a fuel supply amount of the fuel supply mechanism to a target fuel supply amount calculated from a predetermined air supply amount and the target excess air factor when the target excess air factor is smaller than the value equivalent to the stoichiometric air-fuel ratio;
wherein the running state detecting sensor further comprises a sensor which detects a load of the diesel engine and a sensor which detects a rotation speed of the diesel engine, and the controller is further programmed, when the target excess air factor is larger than the value equivalent to the stoichiometric air-fuel ratio equivalent value, to calculate a target engine torque based on the load of the diesel engine and the rotation speed of the diesel engine, calculate a target air amount basic value based on the target engine torque and the rotation speed of the diesel engine, calculate a conversion coefficient based on the target excess air factor and the rotation speed of the diesel engine, set the predetermined air supply amount equal to a value obtained by multiplying the target air amount basic value by the conversion coefficient, and control the air supply amount of the air supply mechanism to the predetermined air supply amount.

18. The excess air factor control device as defined in claim 17, wherein the controller is further programmed, when the target excess air factor is less than the value equivalent to the stoichiometric air-fuel ratio, to calculate a target engine torque based on the load of the diesel engine and the rotation speed of the diesel engine, set a predetermined fuel supply amount equal to a value calculated based on the target engine torque and the rotation speed of the diesel engine, and control the fuel supply amount of the fuel supply mechanism to the predetermined fuel supply amount.

19. The excess air factor control device as defined in claim 17, wherein the running state detecting sensor comprises the controller which is further programmed to count a running time of the diesel engine.

20. The excess air factor control device as defined in claim 17, wherein the controller is further programmed to apply delay processing to the target excess air factor when the target excess air factor varies between a value larger than the value equivalent to the stoichiometric air-fuel ratio and a value which is not larger than the value equivalent to the stoichiometric air-fuel ratio.

21. The excess air factor control device as defined in claim 17, wherein the air supply mechanism comprises a variable geometry turbocharger, and the controller is further programmed to control the air supply amount by varying a turbocharging pressure of the variable geometry turbocharger.

22. The excess air factor control device as defined in claim 17, wherein the air supply mechanism comprises an exhaust gas recirculation valve which recirculates a part of an exhaust gas of the diesel engine into the air supplied by the air supply mechanism, and the controller is further programmed to control the air supply amount by varying an exhaust gas recirculation amount of the exhaust gas recirculation valve.

23. The excess air factor control device as defined in claim 17, wherein the diesel engine comprises an intake passage, the air supply mechanism comprises an intake throttle provided in the intake passage, and the controller is further programmed to control the air supply amount by varying a throttle opening of the intake throttle.

24. The excess air factor control device as defined in claim 17, wherein the diesel engine comprises a nitrogen oxide trap catalyst which traps nitrogen oxides in an exhaust gas of the diesel engine when an excess air factor of the mixture is larger than the value equivalent to the stoichiometric air-fuel ratio, and regenerates a nitrogen oxide trap function of the nitrogen oxide trap catalyst by reducing trapped nitrogen oxides when the excess air factor of the mixture is smaller than the value equivalent to the stoichiometric air-fuel ratio, and the controller is further programmed to determine whether or not a regeneration of the nitrogen oxide trap function is required from the running state, set the target excess air factor to a value larger than the value equivalent to the stoichiometric air-fuel ratio when the regeneration is not required, and set the target excess air factor to a value less than the value equivalent to the stoichiometric air-fuel ratio when the regeneration is required.

25. The excess air factor control device as defined in claim 24, wherein the nitrogen oxide trap catalyst accumulates sulfur in the exhaust gas when the target excess air factor is larger than the value equivalent to the stoichiometric air fuel ratio, and performs a desulphating to release the accumulated sulfur when the target excess air factor is equal to the value equivalent to the stoichiometric air-fuel ratio, and the controller is further programmed to determine whether or not the desulphating is required from the running state, set the target excess air factor to a value larger than the value equivalent to the stoichiometric air-fuel ratio when the desulphating is not required, and set the target excess air factor substantially equal to the value equivalent to the stoichiometric air-fuel ratio when the desulphating is required.

26. The excess air factor control device as defined in claim 17, wherein the diesel engine comprises a particulate filter which traps a particulate matter in the exhaust gas and burns the trapped particulate matter under a predetermined lean air-fuel ratio, and the controller is further programmed to determine whether or not the trapped particulate matter is required to be burned, set the target excess air factor to a first value larger than the value equivalent to the stoichiometric air-fuel ratio when the trapped particulate matter is not required to be burned and set the target excess air factor to a second value which is larger than the value equivalent to the stoichiometric air-fuel ratio but less than the first value when the trapped particulate matter is required to be burned.

27. The excess air factor control device as defined in claim 26, wherein the controller is further programmed to determine that the trapped particulate matter is required to be burned when desulphating is required and set the target excess air factor to the second value after the diesel engine is operated with the target excess air factor substantially equal to the value equivalent to the stoichiometric air-fuel ratio.

28. The excess air factor control device as defined in claim 17, wherein the fuel supply mechanism comprises a fuel injector which injects fuel into the diesel engine, and the controller is further programmed to control a fuel injection timing of the fuel injector to a target injection timing and vary the target injection timing depending on whether or not the target excess air factor is larger than the value equivalent to the stoichiometric air-fuel ratio.

29. The excess air factor control device as defined in claim 28, wherein the controller is further programmed to apply delay processing to the target injection timing when the target excess air factor varies between a value larger than the value equivalent to the stoichiometric air-fuel ratio and a value which is not larger than the value equivalent to the stoichiometric air fuel ratio.

* * * * *